United States Patent
Kei

(10) Patent No.: US 10,951,795 B2
(45) Date of Patent: Mar. 16, 2021

(54) IMAGE PICKUP APPARATUS HAVING MOVABLE PART THAT IS MOVABLE BETWEEN RETRACTED POSITION AND PROJECTING POSITION

(71) Applicant: CANON KABUSHIKI KAISHA, Tokyo (JP)

(72) Inventor: Hidetoshi Kei, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/284,146

(22) Filed: Feb. 25, 2019

(65) Prior Publication Data
US 2019/0289182 A1 Sep. 19, 2019

(30) Foreign Application Priority Data
Mar. 14, 2018 (JP) .............................. JP2018-046801

(51) Int. Cl.
H04N 5/225 (2006.01)
G03B 17/04 (2006.01)
G03B 13/02 (2006.01)
G03B 17/18 (2006.01)

(52) U.S. Cl.
CPC ......... *H04N 5/22525* (2018.08); *G03B 13/02* (2013.01); *G03B 17/04* (2013.01); *H04N 5/2252* (2013.01); *G03B 17/18* (2013.01); *G03B 2215/0507* (2013.01)

(58) Field of Classification Search
None
See application file for complete search history.

(56) References Cited

U.S. PATENT DOCUMENTS

| 4,174,898 A | * | 11/1979 | Iijima | G03B 15/05 |
| | | | | 396/179 |
| 4,280,762 A | * | 7/1981 | Prochnow | G03B 17/04 |
| | | | | 396/349 |
| 4,407,573 A | * | 10/1983 | Wakabayashi | G03B 7/16 |
| | | | | 396/165 |
| 2017/0187964 A1 | * | 6/2017 | Sato | H04N 5/23241 |

FOREIGN PATENT DOCUMENTS

| JP | 08336066 A | * | 12/1996 |
| JP | 2012231198 A | | 11/2012 |

* cited by examiner

*Primary Examiner* — Quan Pham
(74) *Attorney, Agent, or Firm* — Rossi, Kimms & McDowell LLP

(57) ABSTRACT

An image pickup apparatus that is capable of positioning and holding a movable part at both a housing position and a projecting position without adding a lock releasing member. The movable part has a latching pin and a slide part. A fixed part holds the movable part slidably between the housing and projecting positions and is fixed to an apparatus body. A first energizing member energizes the movable part in a projecting direction. A lever has an engagement part and a contact part, is energized by a second energizing member, and is held by the fixed part. The movable part is held in the housing position when the latching pin engages with the engagement part. The contact part abuts on the slide part and energizes the movable part in the projecting direction when the movable part is in the projecting position.

8 Claims, 8 Drawing Sheets

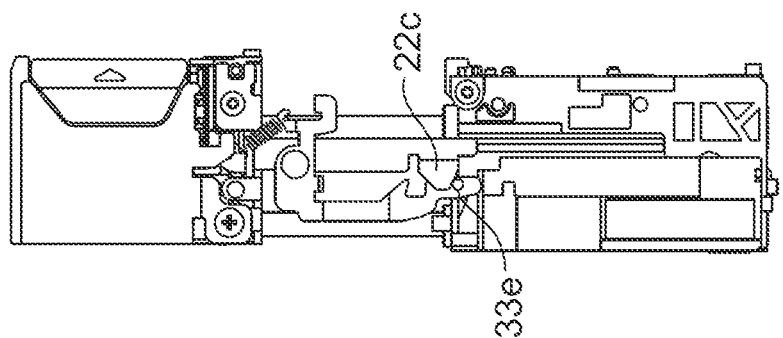
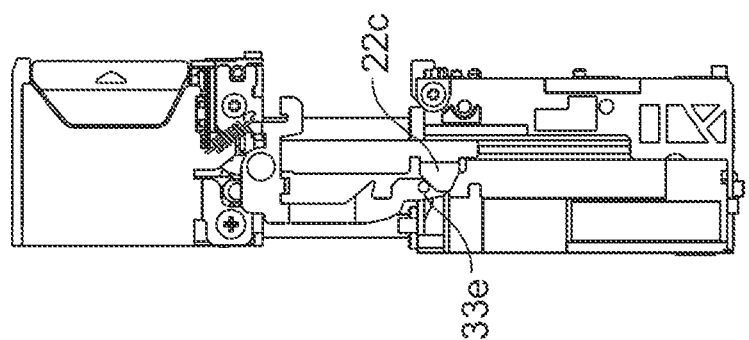
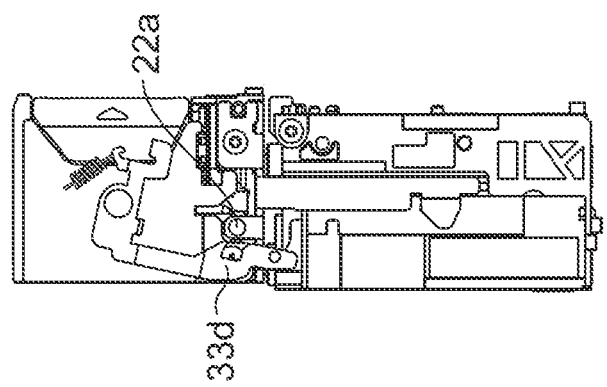
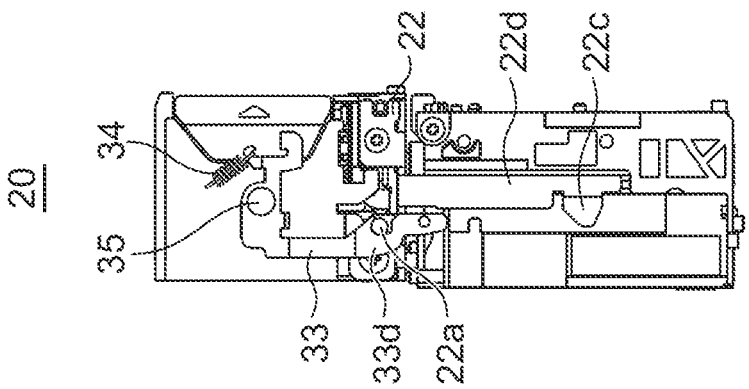

IMAGE PICKUP APPARATUS HAVING MOVABLE PART THAT IS MOVABLE BETWEEN RETRACTED POSITION AND PROJECTING POSITION

BACKGROUND OF THE INVENTION

Field of the Invention

The present invention relates to an image pickup apparatus like a digital camera having a movable part like a display unit that is movable between a housing position inside an apparatus body and a projecting position projected from the apparatus body.

Description of the Related Art

There is an image pickup apparatus like a digital camera having a movable part that is provided so as to be projectable from an apparatus body. The image pickup apparatus is provided with a mechanism that locks and positions the movable part at a projecting position of the movable part. When a lock release lever is operated, the lock is released and the movable part moves to a hosing position inside the apparatus body. Japanese Laid-Open Patent Publication (Kokai) No. 2012-231198 (JP 2012-231198A) discloses a positioning mechanism that locks and positions the movable part at both the housing position and projecting position.

However, the mechanism of JP 2012-231198A requires a lever operation in order to release the lock of the movable part at the projecting position of the movable part. Accordingly, since the number of components constituting the lock mechanism for the movable part increases and its configuration becomes complicated, the miniaturization of the apparatus is disturbed.

SUMMARY OF THE INVENTION

The present invention provides an image pickup apparatus that is capable of positioning and holding a movable part at both a housing position and a projecting position without adding a member for releasing lock of the movable part while saving a space.

Accordingly, an aspect of the present invention provides an image pickup apparatus including an apparatus body, a movable part that has a latching pin and a slide part and enables sliding movement between a housing position inside the apparatus body and a projecting position projected from the apparatus body, a fixed part that holds the movable part slidably and is fixed to the apparatus body, a first energizing member that energizes the movable part in a direction toward the projecting position with respect to the apparatus body, a lever that has an engagement part with which the latching pin engages and a contact part that abuts on the slide part and is held by the fixed part, and a second energizing member that energizes the lever in a direction to engage and in a direction to abut. The movable part is held in the housing position in a state where the latching pin engages with the engagement part. The contact part abuts on the slide part and energizes the movable part in a projecting direction in a case where the movable part is located at the projecting position.

According to the present invention, the image pickup apparatus that is capable of positioning and holding the movable part at both the housing position and the projecting position without adding components for releasing lock of the movable part while saving a space is provided.

Further features of the present invention will become apparent from the following description of exemplary embodiments with reference to the attached drawings.

BRIEF DESCRIPTION OF THE DRAWINGS

FIG. 6A through FIG. 6D are views for describing an action of the locking lever in a case where the electronic view finder moves to a pop-up position from the housing position.

DESCRIPTION OF THE EMBODIMENTS

Figure 1A:
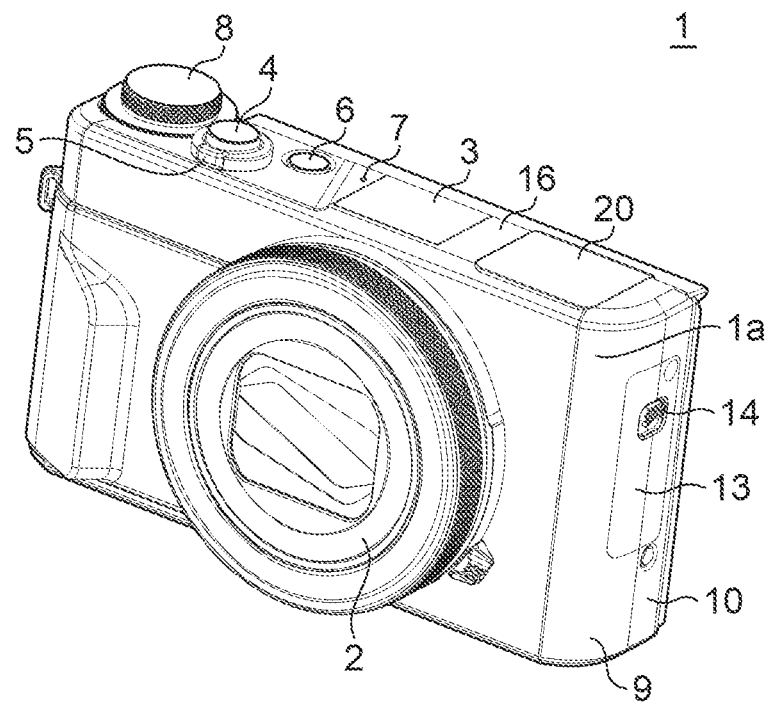
FIG. 1A and FIG. 1B are perspective views showing a digital camera as an example of an image pickup apparatus according to an embodiment of the present invention viewed from a front side and a rear side, respectively.

Hereafter, embodiments according to the present invention will be described in detail by referring to the drawings.

Figure 1B:
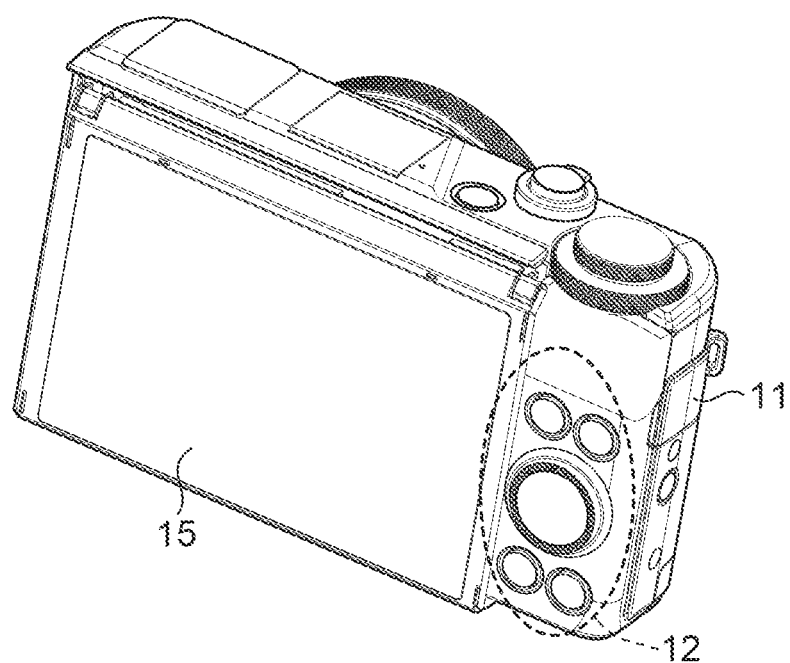

FIG. 1A is a perspective view showing a digital camera as an image pickup apparatus according to an example of the present invention viewed from a front side (an object side). FIG. 1B is a perspective view showing the digital camera shown in FIG. 1A viewed from a rear side.

As shown in FIG. 1A and FIG. 1B, the digital camera (hereinafter referred to as a camera) 1 of the embodiment is constituted by mounting a lens barrel unit 2 including an image pickup optical system (not shown) on a front face of a camera body 1a. Moreover, the camera body 1a includes an image pickup device (not shown) that is constituted by a CCD or CMOS image sensor and generates image data by photoelectrically converting an optical image of an object formed through the image pickup optical system. The lens barrel unit 2 is retractable and is retracted inside the camera body 1a in a housing state. Moreover, a main substrate (not shown), an auxiliary substrate (not shown), etc. on which processing circuits that convert image data generated by the image pickup device into digital information are implemented in the camera body 1a.

Moreover, an electronic flash device 3, a release button 4, a zoom lever 5, a power button 6, a microphone hole 7, a mode setting dial 8, and an electronic view finder 20 as an example of a display unit are provided on a top face of the camera body 1a.

The electronic flash device 3 is built in the camera body 1a. When brightness of an object runs short at the time of photographing, the electronic flash device 3 pops up and emits light. The release button 4 allows press operations of two steps that are a half press state (ON state of SW1) and a full press state (ON state of SW2). When the release button 4 is fully pressed, an object is photographed and the image data of the object image is recorded into a recording medium (not shown).

The zoom lever 5 is held rotatably around the release button 4. A rotational operation of the zoom lever 5 in one direction causes a zoom action toward a telephoto side (a field angle becomes narrower), and a rotational operation in the reverse direction causes a zoom action toward a wide side (the field angle becomes wider).

The mode setting dial 8 is supported so as to be rotatable to the camera body 1a. A plurality of icons (not shown) corresponding to various photographing modes are printed on a top face of the mode setting dial 8. When one of the icons matches an index (not shown) marked on the camera body 1a, the mode corresponding to the matched mode is set.

The electronic view finder 20 is built in the camera body 1a and pops up to a projecting position that is projected upward from the camera body 1a when it is used. Moreover, the electronic view finder 20 is locked at a housing position inside the camera body 1a by a lock mechanism mentioned later in a state where it is held inside the camera body 1a.

The camera body 1a has a front cover 9 that forms an external appearance and covers the front face and a rear cover 10 that forms the external appearance and covers a rear face. Moreover, the camera body 1a has a top cover 16 that forms the external appearance. The top cover 16 has two openings for the electronic view finder 20 and electronic flash device 3. Moreover, a main battery (not shown) used as a power source and a recording medium (not shown) into which data of a photographed object image is recorded are built in the camera body 1a.

Jacks (not shown) for inputting and outputting electric power and signals are provided in a right-side face viewed from the rear side of the camera body 1a. The jacks are covered and protected by a jack cover 11. When the jack cover 11 is opened, the jacks are exposed, which enables extraction and insertion of various cables.

A side cover 13 that forms the external appearance so as to span the front cover 9 and the rear cover 10 is provided in a right-side face viewed from the front side of the camera body 1a. A release lever 14 is held in the side cover 13 so that a sliding operation in a vertical direction will be available. The operation of the release lever 14 causes a pop-up action of the electronic view finder 20.

An operation button group 12 and a display device 15 are provided in the rear face of the camera body 1a. The operation button group 12 consists of a plurality of operation buttons including a cross joint button arranged in the center. The operation buttons of the operation button group 12 are used when entering various instructions, such as an instruction to change a photographing condition and an instruction to switch to a reproduction screen.

The display device 15 is used for check of an object image to be photographed and for reproducing display of a photographed image. An LCD is used as the display device 15, for example. The display device 15 is attached to the camera body 1a through a hinge mechanism (not shown) so as to allow a tilting motion.

Figure 2A:
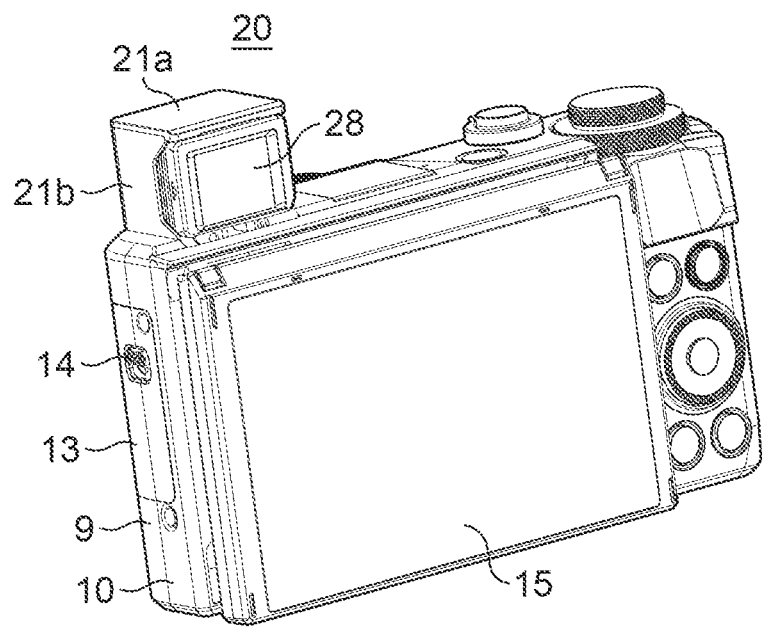
FIG. 2A is a perspective view showing a state where an electronic view finder of the digital camera pops up viewed from the rear side.

Next, the actions of the electronic view finder 20 will be described by referring to FIG. 2A and FIG. 2B. FIG. 2A is a perspective view showing a state where the electronic view finder 20 is located at a pop-up position (projecting position) that is projected upward from the camera body 1a viewed from the rear side. When the release lever 14 of the camera body 1a is operated, the electronic view finder 20 moves to the pop-up position (FIG. 2A) from the housing position (FIG. 1B) stored in the camera body 1a.

Figure 2B:
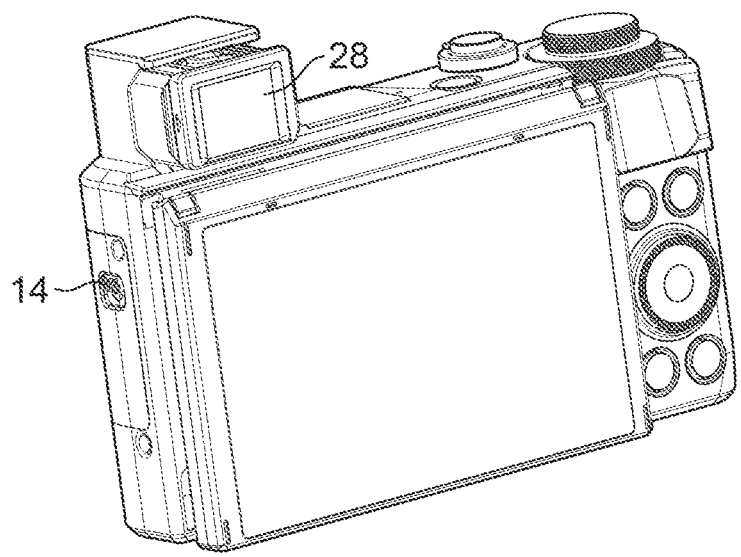
FIG. 2B is a perspective view showing a state where an eye piece of the electronic view finder is pulled from the state shown in FIG. 2A viewed from the rear side.

FIG. 2B shows a state where an eye piece 28 of the electronic view finder 20 is pulled toward the rear side of the camera body 1a from the state shown in FIG. 2A. When the eye piece 28 is pulled toward the rear side, the electronic view finder 20 becomes available for checking an object image to be photographed and reproducing display of a photographed image through the eye piece 28.

In this embodiment, the display is switched between the electronic view finder 20 and the display device 15 according to a detection result of a sensor module (not shown) that detects a pulling operation of the eye piece 28. When the eye piece 28 is pulled out, the electronic view finder 20 displays an image. When the finder is stored, the display device 15 displays an image. It should be noted that the sensor module may be an infrared proximity sensor (not shown) provided near the eye piece 28, for example. In such a case, the display is switched to the electronic view finder 20 when the sensor detects that a user looks in the eye piece 28.

Figure 3:
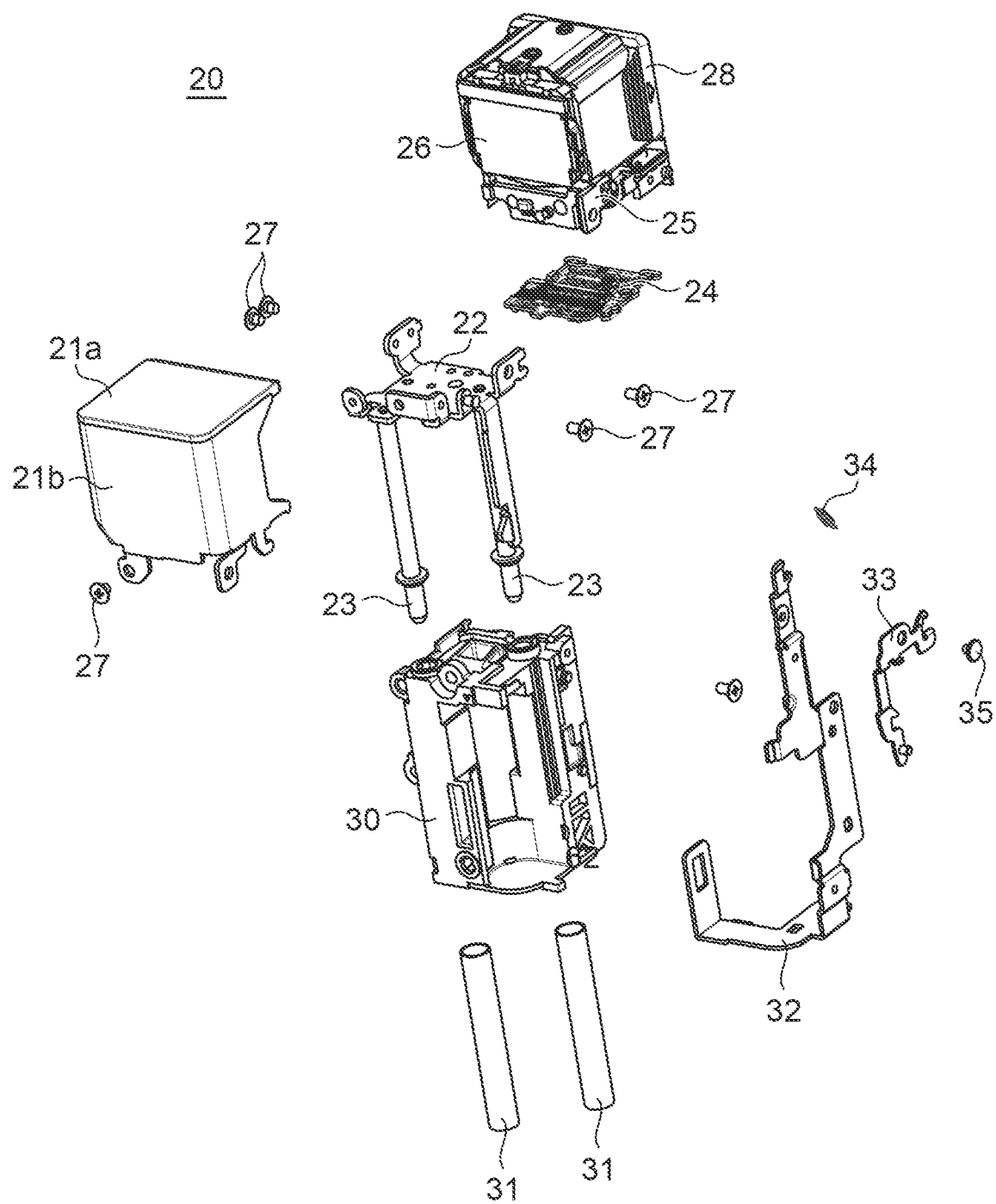
FIG. 3 is an exploded perspective view of the electronic view finder.

Next, the configuration of the electronic view finder 20 will be described by referring to FIG. 3. FIG. 3 is an exploded perspective view of the electronic view finder 20. As shown in FIG. 3, the electronic view finder 20 is provided with a cover 21a that forms an external appearance and covers a top face and a side casing 21b that forms the external appearance and covers side faces. The base plate 22 is made of a sheet metal, and two metal guide bars 23 are caulked. A substrate 24 is positioned and fixed to an EVF casing 25 that is made from resin.

A display panel 26 is arranged in the EVF casing 25 at the opposite side of the eye piece 28. A flexible substrate (not shown) for transmitting an image signal from the main substrate (not shown) inside the camera body 1a is connected to the substrate 24. Furthermore, the signal is transferred to the display panel 26 through a flexible substrate (not shown) that connects the display panel 26 and the substrate 24. An optical lens group (not shown) is arranged inside the EVF casing 25 so as to allow the user who looks in the eye piece 28 to check an image displayed on the display panel 26. The EVF casing 25 that holds the substrate 24, the display panel 26, etc. is fixed to the base plate 22 together with the side casing 21b with a plurality of fastening screws 27.

The EVF holder 30 that is made from resin holds the above-mentioned guide bars 23 that are inserted thereto so as to allow sliding movement in the vertical direction. The EVF holder 30 is positioned and fixed to the front cover 9 (FIG. 1A). Pop-up springs (first energizing members) 31 are stored inside the EVF holder 30 and energizes the guide bars 23 upwardly. A spring holder 32 is made of a sheet metal and is fixed to the EVF holder 30 so as to press down ends of the pop-up springs 31. The EVF holder 30 and spring holder 32 constitute an example of the fixed part of the present invention.

A lock lever (lever) 33 is rotatably held by the spring holder 32 with a caulking pin 35. An energizing spring (second energizing member) 34 engages with the lock lever 33 at one end and engages with the spring holder 32 at the other end to energize the lock lever 33 in one direction.

Figure 4A:
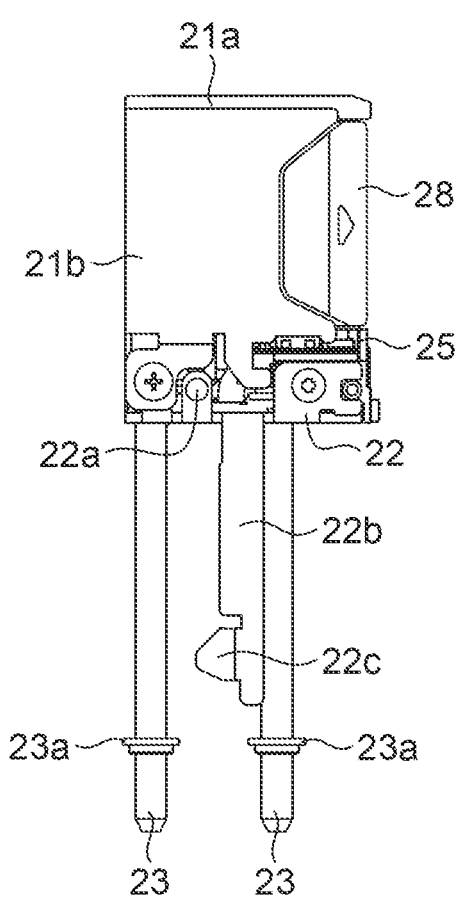
FIG. 4A is a side view showing a movable unit of the electronic view finder.

Next, detailed shapes of a movable unit (movable part) and the locking lever 33 of the electronic view finder 20 will be described by referring to FIG. 4A and FIG. 4B. FIG. 4A is a side view showing the movable unit of the electronic view finder 20. As shown in FIG. 4A, the EVF casing 25 that is covered with the cover 21a and side casing 21b is fixed to the base plate 22. A latching pin 22a that engages with the lock lever 33 at a pop-down position (the housing position) is caulked to the base plate 22. Moreover, an arm 22b is extended downward from the base plate 22. A taper part 22c is formed in a tip end of the arm 22b. A flange 23a that partially enlarges the diameter is formed in each of the guide bars 23 caulked to the base plate 22.

Figure 4B:
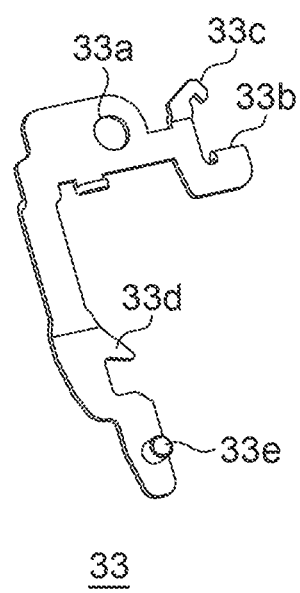
FIG. 4B is a perspective view showing a locking lever of the electronic view finder.

FIG. 4B is a detail view of the lock lever 33. The lock lever 33 is held rotatably around a hole 33a by inserting the caulking pin 35 (FIG. 3) mentioned above. At the time of the sliding operation of the release lever 14 shown in FIG. 1A and FIG. 2A, a projection (not shown) of the release lever 14A abuts on and presses a bending part 33b, which rotates the lock lever 33 against the force of the energizing spring 34. A hook 33c is formed so that one end of the energizing spring 34 (FIG. 3) can be caught.

A latching claw 33d is formed so as to engage with the latching pin 22a provided in the base plate 22 of the movable unit. An engaging pin 33e is caulked to a front end of the lock lever 33 and is formed so as to abut on the taper part 22c of the base plate 22 at the time of popping up.

Figure 5A:
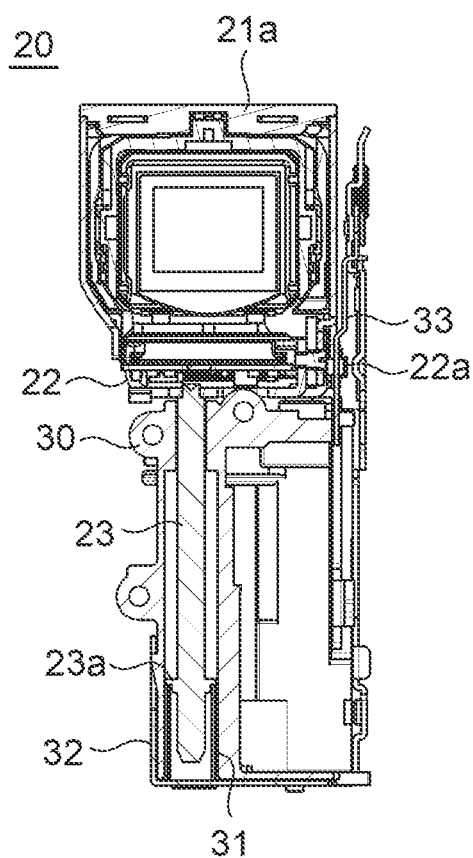
FIG. 5A and FIG. 5B are sectional views respectively showing a state where the electronic view finder is located at a housing position and a state where the electronic view finder pops up.

Next, the pop-up actions of the electronic view finder 20 will be described by referring to FIG. 5A, FIG. 5B, FIG. 6A, and FIG. 6D. FIG. 5A is a sectional view showing the state where the electronic view finder 20 is located at the housing position. In the state in FIG. 5A, the electronic view finder 20 is held in a state where the lock lever 33 engages with the latching pin 22a of the base plate 22. At this time, since the pop-up springs 31 give pressure to the flanges 23a of the guide bars 23 upwardly, the movable unit is also energized in the pop-up direction (the upward direction).

Figure 5B:
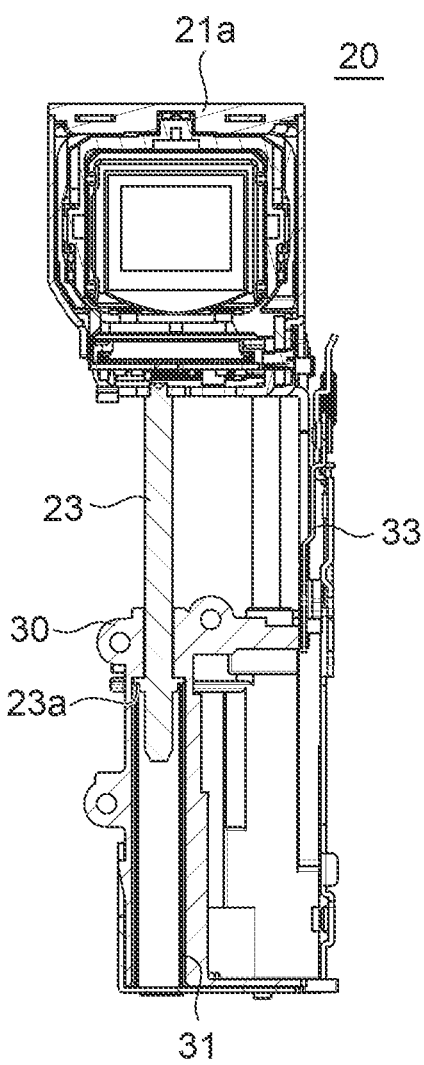

FIG. 5B is a sectional view showing the state where the electronic view finder 20 is located at the pop-up position. In the state in FIG. 5B, the guide bars 23 pressed upwardly by the pop-up springs 31 stop because the flanges 23a abut on the EVF holder 30.

FIG. 6A through FIG. 6D are views for describing an action of the locking lever 33 in a case where the electronic view finder 20 moves to the pop-up position from the housing position.

In a state shown in FIG. 6A, the electronic view finder 20 is arranged at the housing position and stops because the latching claw 33d of the lock lever 33 engages with the latching pin 22a of the base plate 22. In this state, the lock lever 33 is energized by the energization spring 34 in the direction to engage with the latching pin 22a.

FIG. 6B shows a state where the lock lever 33 is released at the housing position of the electronic view finder 20. In this state, the lock lever 33 rotates in a direction away from the latching pin 22a of the base plate 22 as an example of an engagement part against the energization force of the energization spring 34 and stops. This enables a pop-up action of the movable unit held by the base plate 22 upwardly.

FIG. 6C shows a state of the movable unit in the middle of the pop-up action. When the user releases hold of the release lever 14 (FIG. 1A) in the state shown in FIG. 6B, the lock lever 33 rotates by the energization force of the energization spring 34 to an initial position and stops. In this state, when the movable unit moves upwardly, the taper part 22c of the base plate 22 abuts on the engaging pin 33e of the lock lever 33. After that, the engaging pin 33e is pressed by the taper part 22c, and the lock lever 33 begins to rotate in a releasing direction.

FIG. 6D shows a state where the movable unit pops up and stops. In this state, the movable unit stops because the flanges 23a of the guide bars 23 run against the EVF holder 30 as shown in FIG. 5B mentioned above. The lock lever 33 rotates to the initial position by the energization force of the energization spring 34 and stops. In that time, the engaging pin 33e of the lock lever 33 abuts on the taper part 22c of the base plate 22.

Figure 7A:
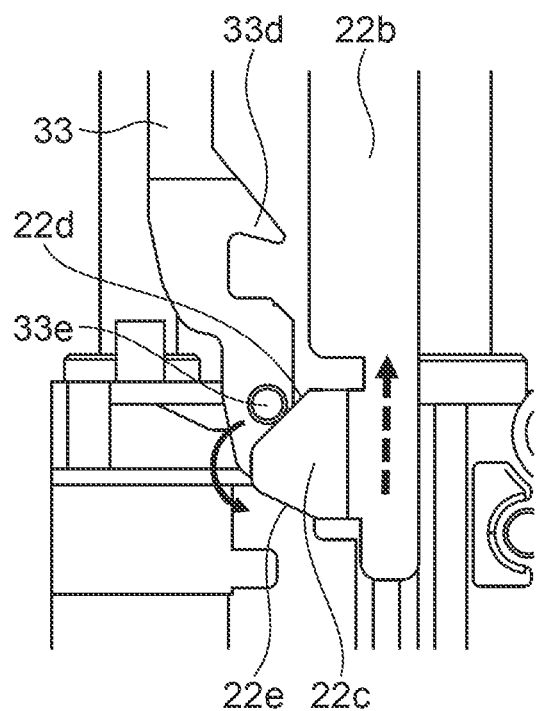
FIG. 7A and FIG. 7B are views for describing the action of the locking lever in detail.

Next, a holding mechanism in a case where the electronic view finder 20 is located at the pop-up position will be described by referring to FIG. 7A and FIG. 7B. FIG. 7A is a view showing details of the taper part 22c of the base plate 22 in the middle of the pop-up action of the movable unit.

In the state shown in FIG. 7A, a first slope face 22d located at the upper section of the taper part 22c abuts on the engaging pin 33e of the lock lever 33. Furthermore, when the movable unit slides upwardly, the engaging pin 33e moves along with the first slope face 22d, which starts to rotate the lock lever 33 in the releasing direction. At this time, a slope angle of the first slope face 22d provided in the taper part 22c is determined so as to lessen load of the upward sliding movement of the movable unit.

Figure 7B:
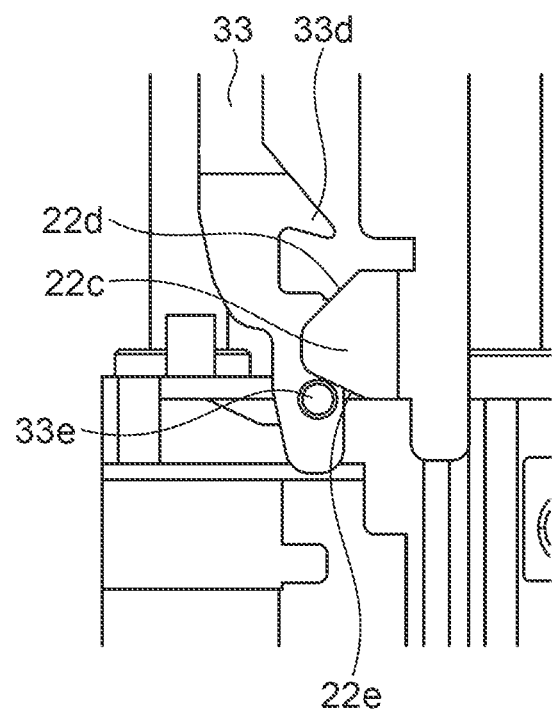

FIG. 7B shows a state where the movable unit finishes the pop-up action and stops. The engaging pin 33e that was pushed by the first slope face 22d and moved from the position shown in FIG. 7A further moves along with a second slope face 22e located at the lower section of the taper part 22c, and the lock lever 33 rotates in an engaging direction and stops.

In the state shown in FIG. 7B, since the engaging pin 33e of the lock lever 33 abuts on the second slope face 22e of the taper part 22c, backlash of the movable unit in the vertical direction in the pop-up state is prevented and the movable unit is held so as to make a downward movement difficult. A slope angle of the second slope face 22e is determined so that the engaging pin 33e of the lock lever 33 does not overcome the taper part 22c easily.

As illustrated, the slope angles of the first slope face 22d and second slope face 22e formed in the taper part 22c of the base plate 22 are different to each other.

Moreover, in the state shown in FIG. 7B, since the taper part 22c of the base plate 22 pressure-contacts with the engaging pin 33e of the lock lever 33, electrical connection between the movable unit and the camera body 1a becomes available even in the pop-up state.

Figure 8:
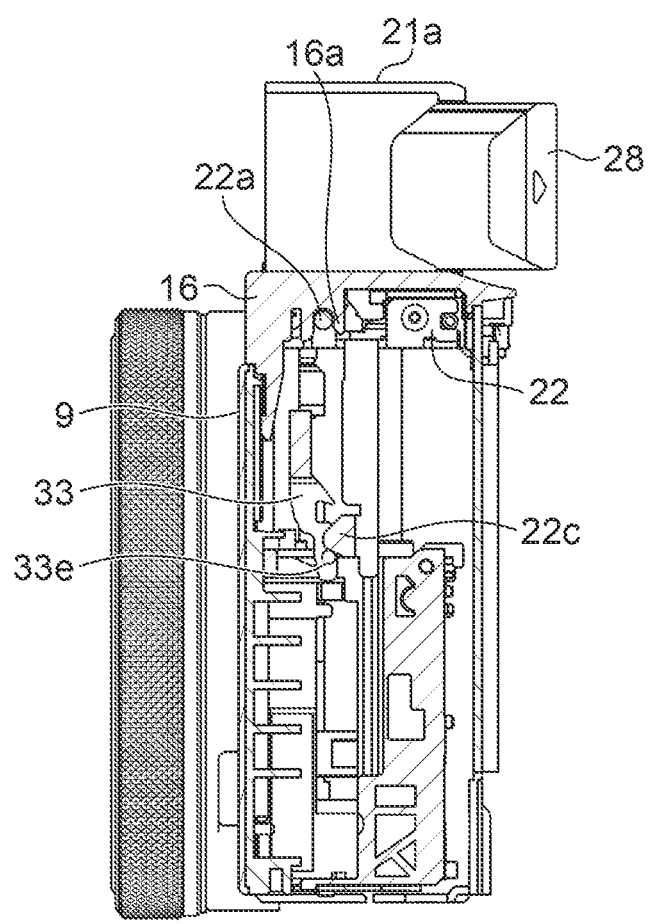
FIG. 8 is a sectional view of a main part showing an internal structure of the digital camera in a state where the movable unit pops up.

Next, a mechanism for removing backlash in the front-and-back direction in the state where the movable unit pops up will be described by referring to FIG. 8. FIG. 8 is a sectional view showing a main part of the internal structure in the state where the movable unit pops up.

In the state shown in FIG. 8, the movable unit is energized upwardly by the pop-up springs 31 (FIG. 3). Moreover, the engaging pin 33e (contact part) of the lock lever 33 pressure-contacts with the second slope face 22e (slide part) of the taper part 22c, which removes the backlash in the vertical direction and enables the electrical connection. Furthermore, the backlash of the movable unit in the front-and-back direction is removed by engaging the latching pin 22a of the base plate 22 to a concave portion 16a formed inside the top cover 16 of the camera body 1a. Thereby, the backlash is reduced when the movable unit is popped up and the eye piece 28 is pulled, which improves quality.

As described above, in this embodiment, the movable unit is locked at the housing position using the lock lever 33 and is positioned and held at the pop-up position in the configuration that pops up the electronic view finder 20 upwardly.

Moreover, since the electrical connection between the movable unit and the camera body 1a becomes available by using the lock lever 33 at the pop-up position, breakage of the display panel 26, the substrate 24, etc. is avoided when static electricity is applied to the electronic view finder 20, Furthermore, since the latching pin 22a of the movable unit fits into the top cover 16 at the pop-up position, the backlash in the front-and-back direction can be removed.

Accordingly, the camera that is capable of positioning and holding the movable part at both the housing position and the projecting position without adding components for releasing lock of the movable part while saving a space is provided.

It should be noted that the present invention is not limited to what has been described with the above-mentioned embodiment, quality of the material, a shape, a size, a formation, the number of elements, arrangement locations, etc., can be changed suitably unless it is deviated from the scope of the present invention.

For example, although the case where the electronic view finder 20 pops up is exemplified in the above-mentioned embodiment, the present invention may be applied to a case where an optical finder or another device pops up.

OTHER EMBODIMENTS

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-046801, filed Mar. 14, 2018, which is hereby incorporated by reference herein in its entirety.

What is claimed is:

1. An image pickup apparatus comprising:
an apparatus body;
a movable part that has a latching pin and a slide part and enables sliding movement between a housing position inside the apparatus body and a projecting position projected from the apparatus body;
a holder that holds the movable part slidably and is fixed to the apparatus body;
a first energizing spring that energizes the movable part in a direction toward the projecting position with respect to the apparatus body;
a lever that has an engagement part with which the latching pin engages and a contact part that abuts on the slide part, and is held by the holder so as to be rotatable around a rotational axis; and
a second energizing spring that energizes the lever in a direction to engage and in a direction to abut,
wherein the movable part is held in the housing position in a state where the latching pin engages with the engagement part, and
wherein the contact part abuts on the slide part and energizes the movable part in a projecting direction in a case where the movable part is located at the projecting position,
wherein the contact part is arranged, when viewed from a direction of the sliding movement, farther than the latching pin with respect to the rotational axis.

2. The image pickup apparatus according to claim 1, wherein the slide part has a first slope face that abuts on the contact part so as to rotate the lever against energization force of the second energizing spring during movement of the movable part from the housing position to the projecting position.

3. The image pickup apparatus according to claim 2, wherein the contact part abuts on a second slope face provided in the slide part to energize the movable part in the projecting direction in the case where the movable part is located at the projecting position.

4. The image pickup apparatus according to claim 3, wherein slope angles of the first slope face and the second slope face are different to each other.

5. The image pickup apparatus according to claim 3, wherein electrical connection between the movable part and the holder is available because the second slope face pressure-contacts with the contact part in the case where the movable part is located at the projecting position.

6. The image pickup apparatus according to claim 1, wherein a concave portion with which the latching pin of the movable part is engaged in a case where the movable part is moved to the projecting position is formed in the apparatus body.

7. The image pickup apparatus according to claim 1, wherein the movable part is a display unit.

8. The image pickup apparatus according to claim 7, wherein the display unit is an electronic view finder.

* * * * *